(12) United States Patent
Rivett et al.

(10) Patent No.: US 7,514,152 B2
(45) Date of Patent: Apr. 7, 2009

(54) OXYGEN SCAVENGING FILM WITH GOOD INTERPLY ADHESION

(75) Inventors: Janet Rivett, Simpsonville, SC (US); Drew V. Speer, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 354 days.

(21) Appl. No.: 11/339,779

(22) Filed: Jan. 25, 2006

(65) Prior Publication Data

US 2006/0177653 A1   Aug. 10, 2006

Related U.S. Application Data

(60) Provisional application No. 60/651,867, filed on Feb. 10, 2005.

(51) Int. Cl.
  *B32B 27/08* (2006.01)
  *B32B 27/30* (2006.01)
  *B32B 27/32* (2006.01)

(52) U.S. Cl. .................. 428/516; 428/517; 428/519; 428/520

(58) Field of Classification Search .......... 428/516, 428/517, 519, 520
See application file for complete search history.

(56) References Cited

U.S. PATENT DOCUMENTS

| | | | |
|---|---|---|---|
| 5,206,075 A | 4/1993 | Hodgson, Jr. | 428/216 |
| 5,211,875 A | 5/1993 | Speer et al. | 252/188.28 |
| 5,350,622 A | 9/1994 | Speer et al. | 428/215 |
| 5,364,486 A | 11/1994 | Falla et al. | 156/308.4 |
| 5,530,065 A | 6/1996 | Farley et al. | 525/240 |
| 5,747,594 A | 5/1998 | deGroot et al. | 525/240 |
| 5,859,145 A | 1/1999 | Ching et al. | 525/330.6 |
| 6,214,254 B1 | 4/2001 | Gauthier et al. | 252/188.28 |
| 6,255,248 B1 | 7/2001 | Bansleben et al. | 502/159 |
| 6,287,481 B1 | 9/2001 | Luthra et al. | 252/188.28 |
| 6,391,403 B1 | 5/2002 | Blinka et al. | 428/34.4 |
| 6,689,314 B2 * | 2/2004 | Bushman et al. | 422/24 |
| 2001/0028929 A1 | 10/2001 | Breck et al. | 428/35.5 |
| 2002/0006482 A1 | 1/2002 | Falla et al. | 428/35.2 |
| 2003/0152727 A1 | 8/2003 | Jerdee et al. | 428/36.1 |
| 2004/0014895 A1 | 1/2004 | Farley et al. | 525/240 |
| 2005/0085577 A1 | 4/2005 | Ching et al. | 524/394 |

FOREIGN PATENT DOCUMENTS

| | | |
|---|---|---|
| EP | 0 719 829 | 7/1996 |
| WO | 97/32925 | 9/1997 |
| WO | 99/06476 | 2/1999 |
| WO | 99/748963 | 9/1999 |
| WO | 00/11972 | 3/2000 |
| WO | 03/095201 | 11/2003 |
| WO | 2004/039583 | 5/2004 |

OTHER PUBLICATIONS

PCT International Preliminary Report on Patentability, issued Aug. 14, 2007 (8 pages).

* cited by examiner

*Primary Examiner*—D. S Nakarani
(74) *Attorney, Agent, or Firm*—Mark B. Quatt

(57) ABSTRACT

An oxygen scavenger film includes a layer including a blend of an oxygen scavenger and a polymer selected from high density polyethylene, polypropylene or a propylene copolymer, and a sealant layer. Alternatively, both the oxygen scavenging layer and the sealant layer include a polymer selected from high density polyethylene, polypropylene or a propylene copolymer. The hot tack strength of these films is at least 2.0 Newtons/inch at 135° C., according to ASTM F 1921-98, measured with DTC instrumentation.

23 Claims, No Drawings

OXYGEN SCAVENGING FILM WITH GOOD INTERPLY ADHESION

This application claims the benefit of U.S. Provisional Application Ser. No. 60/651,867 filed Feb. 10, 2005, the contents of which are hereby incorporated by reference.

FIELD OF THE INVENTION

The invention relates to oxygen scavenging multilayer films with good interply adhesion.

BACKGROUND OF THE INVENTION

It is known that many oxygen sensitive products, including food products such as meat and cheese, smoked and processed luncheon meats, as well as non-food products such as electronic components, pharmaceuticals, and medical products, deteriorate in the presence of oxygen. Both the color and the flavor of foods can be adversely affected. The oxidation of lipids within the food product can result in the development of rancidity. These products benefit from the use of oxygen scavengers in their packaging.

One particular oxygen scavenger that has proved useful commercially is poly(ethylene/methyl acrylate/cyclohexene methyl acrylate) (abbreviated as EMCM). Although EMCM containing oxygen scavenging films have excellent cold seal strength, an EMCM layer tends to delaminate from adjacent layers at temperatures of 100 to 150° C. These temperatures are typical of those encountered during, or immediately after, heat-sealing of the film to itself or another material. Delamination can occur in packaging applications where vertically formed and filled packages are loaded before the heat seals are able to cool substantially. Due to poor interlayer adhesion at these elevated temperatures, the films can delaminate at the EMCM interface when seals are pulled before they are totally cooled.

In demanding packaging applications such as vertical form fill seal pouch packaging, where transverse heat seals are used, poor interlaminar bond strength will be manifested as a low hot tack value (below 2.0 Newtons/inch at 135° C.). The failure mode is typically one of delamination at the interface of the sealant layer and the EMCM layer, and/or the EMCM layer and the next adjacent (internal) layer.

A target hot tack value, which will represent a value typically minimally acceptable for many packaging applications, is at least 2.0 Newtons/inch at 135° C. Desirable values include from 2.0 to 10 Newtons/inch, such as 2.5 to 9.5 Newtons/inch, such as 3.0 to 9.0, 3.5 to 8.5, and 4 to 8 Newtons/inch at 135° C. Hot tack is measured in accordance with ASTM F 1921-98, which is incorporated herein by reference in its entirety. This ASTM test designates the use of either DTC or Theller instrumentation.

SUMMARY OF THE INVENTION

In a first aspect of the present invention, an oxygen scavenger film comprises a layer comprising a blend of an oxygen scavenger and a polymer selected from high density polyethylene, polypropylene or a propylene copolymer, and a sealant layer; wherein the hot tack strength of the film is at least 2.0 Newtons/inch at 135° C., according to ASTM F1921-98, measured with DTC instrumentation. In one embodiment, at least one layer of the film is cross-linked. In another embodiment, the film is heat shrinkable.

In a second aspect of the present invention, an oxygen scavenger film comprises a layer comprising a blend of an oxygen scavenger and a polymer selected from high density polyethylene, poly-propylene or a propylene copolymer, and a sealant layer comprising a polymer selected from high density polyethylene, polypropylene or propylene copolymer; wherein the hot tack strength of the film is at least 2.0 Newtons/inch at 135° C., according to ASTM F 1921-98, measured with DTC instrumentation. In one embodiment, at least one layer of the film is cross-linked. In another embodiment, the film is heat shrinkable.

Definitions

"High density polyethylene" (HDPE) is an ethylene homopolymer or copolymer with a density of at least 0.940 g/cc.

"Polypropylene" (PP) is a propylene homopolymer prepared by conventional heterogeneous Ziegler-Natta type initiators.

"Propylene copolymer" (EPC) is a copolymer having greater than 50 mole percent propylene. Propylene copolymers are typically prepared with ethylene or butene comonomers.

"Oxygen scavenger", "oxygen scavenging", and the like herein means or refers to a composition, compound, film, film layer, coating, insert, plastisol, gasket, or the like which can consume, deplete or react with oxygen from a given environment.

"Ethylene/alpha-olefin copolymer" (EAO) herein refers to copolymers of ethylene with one or more comonomers selected from $C_3$ to $C_{10}$ alpha-olefins such as propene, butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, and ESCORENE™ or EXCEED™ resins supplied by Exxon; as well as linear homogeneous ethylene/alpha olefin copolymers (HEAO) such as TAFMER™ resins supplied by Mitsui Petrochemical Corporation, EXACT™ resins supplied by Exxon, or long chain branched (HEAO) AFFINITY™ resins supplied by the Dow Chemical Company, or ENGAGE™ resins supplied by DuPont Dow Elastomers.

"Ethylene homopolymer or copolymer" herein refers to ethylene homopolymer such as low density polyethylene; ethylene/alpha olefin copolymer such as those defined herein; ethylene/vinyl acetate copolymer; ethylene/alkyl acrylate copolymer; ethylene/(meth)acrylic acid copolymer; or ionomer resin.

"Film" herein means a film, laminate, sheet, web, coating, or the like, which can be used to package an oxygen sensitive product. The film can be used as a component in a rigid, semi-rigid, or flexible product, and can be adhered to a non-polymeric or non-thermoplastic substrate such as paper or metal. The film can also be used as a coupon or insert within a package.

"Functional barrier" herein means a polymeric material that acts as a selective barrier to by-products from the oxygen scavenging reaction, but is not itself a significant barrier to oxygen.

"Polymer" and the like herein means a homopolymer, but also copolymers thereof, including bispolymers, terpolymers, etc.

"Trigger" and the like herein means that process defined in U.S. Pat. No. 5,211,875 (Speer et al.), incorporated herein by reference in its entirety, whereby oxygen scavenging is initiated (i.e. activated) by subjecting an article such as a film to actinic radiation, having a wavelength of less than about 750 nm at an intensity of at least about 1.6 mW/cm$^2$ or ionizing radiation such as an electron beam at a dose of at least 0.2 megarads (MR), or gamma radiation, wherein after initiation the oxygen scavenging rate of the article is at least about 0.05 cc oxygen per day per gram of oxidizable organic compound for at least two days after oxygen scavenging is initiated. A method offering a short "induction period" (the time that elapses, after exposing the oxygen scavenging component to a source of actinic radiation, before the oxygen scavenging activity begins) is useful in situations where the oxygen scavenging component is desirably activated at or immediately prior to use. Triggering can thus occur during filling and sealing of a container, which is made wholly or partly from the article, and containing an oxygen sensitive material.

Thus, "trigger" refers to subjecting an article to actinic radiation as described above; "triggered" refers to an article that has been subjected to such actinic radiation; "initiation" refers to the point in time at which oxygen scavenging actually begins or is activated; and "induction time" refers to the length of time, if any, between triggering and initiation. The onset of oxygen scavenging can be measured by any convenient means such as a reduction in headspace oxygen concentration, or an increase in barrier property as in the case of an active oxygen barrier system. One useful technology is the use of certain porphyrins as an oxygen indicator in a solid article such as a film, as disclosed in U.S. Pat. No. 6,689,438 (Kennedy et al.), incorporated herein by reference in its entirety.

All compositional percentages used herein are presented on a "by weight" basis, unless designated otherwise.

DETAILED DESCRIPTION OF THE INVENTION

An oxygen scavenger film of the invention can include multiple layers, dependent upon the properties required of the film. For example, layers to achieve appropriate slip, modulus, oxygen or water vapor barrier, meat adhesion, heat seal, or other chemical or physical properties can optionally be included. The film may be manufactured by a variety of processes including, extrusion, coextrusion, lamination, coating, and the like.

Although EMCM containing oxygen scavenging films typically have excellent cold seal strength, an EMCM layer tends to delaminate from adjacent layers at temperatures of 100 to 150° C. These temperatures are typical of those encountered during, or immediately after, heat-sealing of the film to itself or another material. Delamination can occur in packaging applications where force is applied to the seals before the heat seals are able to cool substantially. This delamination results in low hot tack strength.

It has now been found that seal delamination can be reduced by incorporating HDPE, PP, or EPC, or any combination of these materials, into the oxygen scavenging layer of a film, and optionally additionally into the sealant layer and/or the functional barrier layer of a film. Compounding of the HDPE, PP, or EPC with the other polymer(s) of the sealing layer, or the other polymer(s) of the oxygen scavenging layer, may enhance the consistency of the hot tack strength improvement. When rapid headspace oxygen scavenging is required, the amount of the HDPE, PP, or EPC required in a given layer will typically range from 5 to 30%. When utilized as a functional barrier, the HDPE, PP, or EPC can comprise up to 100% of the layer.

An outer layer of the film, such as a layer that will function as a sealant layer of the film, can comprise one or more polymers. Polymers that may be used for the outer layer include any resin typically used to formulate packaging films with heat seal properties such as various polyolefin copolymers including ethylene polymer or copolymer, ethylene/alpha olefin copolymer, ethylene/vinyl acetate copolymer, ionomer resin, ethylene/acrylic or methacrylic acid copolymer, ethylene/acrylate or methacrylate copolymer, low density polyethylene, or blends of any of these materials. The oxygen transmission rate of the sealant material will determine in part the rate that an oxygen scavenging film can remove oxygen from the headspace of a package. For rapid headspace scavenging, the sealant material in one embodiment comprises an ethylene/alpha olefin copolymer with a density less than 0.917 g/cc, e.g. less than 0.910 g/cc. In another embodiment, the sealant material of this invention comprises low density or very low density ethylene/alpha olefin copolymer blended with a higher melting polymer selected from high density polyethylene, polypropylene and/or a propylene copolymer. The higher melting polymer has a melting point at least 9° C. greater than the melting point of the ethylene/alpha olefin that also comprises the layer, e.g. at least 15° C. greater, or at least 25° C. greater than the above described ethylene/alpha olefin copolymer as determined by DSC.

Additional materials that can be incorporated into an outer layer of the film include antiblock agents, slip agents, antifog agents, etc. in any appropriate amount.

Oxygen Barrier Film

High oxygen barrier films in accordance with the invention can be made from materials having an oxygen permeability, of the barrier material, less than 500 cm$^3$ O$_2$/m$^2$·day·atmosphere (tested at 1 mil thick and at 25° C. according to ASTM D3985), such as less than 100, less than 50, less than 25, less than 10, less than 5, or less than 1 cm$^3$ O$_2$/m$^2$·day·atmosphere. Examples of polymeric materials with low oxygen transmission rates are ethylene/vinyl alcohol copolymer (EVOH), polyvinylidene dichloride (PVDC), vinylidene chloride/methyl acrylate copolymer, polyamide, and polyester.

Alternatively, metal foil or SiOx compounds can be used to provide low oxygen transmission to the film of the invention. Metalized foils can include a sputter coating or other application of a metal layer to a polymeric substrate such as high density polyethylene (HDPE), ethylene/vinyl alcohol copolymer (EVOH), polypropylene (PP), polyethylene terephthalate (PET), polyethylene naphthalate (PEN), and polyamide (PA).

Alternatively, oxide coated webs (e.g. aluminum oxide or silicon oxide) can be used to provide low oxygen transmission to the film. Oxide coated foils can include a coating or other application of the oxide, such as alumina or silica, to a polymeric substrate such as high density polyethylene (HDPE), ethylene/vinyl alcohol copolymer (EVOH), polypropylene (PP), polyethylene terephthalate (PET), polyethylene naphthalate (PEN), and polyamide (PA).

Multilayer films of the invention can be made using conventional extrusion, coextrusion, extrusion coating, and/or lamination processes. Likewise, conventional manufacturing processes can be used to make a pouch, a bag, or other container from the film.

Hermetic sealing of a pouch, bag, or other container made from the film of the invention will typically be preferable.

The exact requirements of a film of the invention will depend on a variety of factors, including the chemical nature of the oxygen scavenger, amount of the oxygen scavenger, concentration of the oxygen scavenger in a host material or diluent, physical configuration of the oxygen scavenger, presence of hermetic sealing, vacuumization and/or modified atmosphere inside a container made from the inventive film, initial oxygen concentration inside the container, intended end use of the oxygen scavenger, intended storage time of the container before use, level of initial dose of actinic radiation, etc.

Polymeric adhesives that can be used in embodiments of the present invention include e.g. ethylene/vinyl acetate copolymer; anhydride grafted ethylene/vinyl acetate copolymer; anhydride grafted ethylene/alpha olefin copolymer; anhydride grafted polypropylene; anhydride grafted low density polyethylene; ethylene/methyl acrylate copolymer; and anhydride grafted ethylene/methyl acrylate copolymer.

The Oxygen Scavenger

Oxygen scavengers suitable for commercial use in films of the present invention are disclosed in U.S. Pat. No. 5,350,622, and a method of initiating oxygen scavenging generally is disclosed in U.S. Pat. No 5,211,875. Suitable equipment for initiating oxygen scavenging is disclosed in U.S. Pat. No. 6,287,481 (Luthra et al.). These patents are incorporated herein by reference in their entirety. According to U.S. Pat. No. 5,350,622, oxygen scavengers are made of an ethylenically unsaturated hydrocarbon and transition metal catalyst. The ethylenically unsaturated hydrocarbon may be either substituted or unsubstituted. As defined herein, an unsubstituted ethylenically unsaturated hydrocarbon is any compound that possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%-99% by weight carbon and hydrogen. Suitable substituted or unsubstituted ethylenically unsaturated hydrocarbons are those having two or more ethylenically unsaturated groups per molecule, e.g. a polymeric compound having three or more ethylenically unsaturated groups and a molecular weight equal to or greater than 1,000 weight average molecular weight.

Examples of unsubstituted ethylenically unsaturated hydrocarbons include, but are not limited to, diene polymers such as polyisoprene, (e.g., trans-polyisoprene) and copolymers thereof, cis and trans 1,4-polybutadiene, 1,2-polybutadienes, (which are defined as those polybutadienes possessing greater than or equal to 50% 1,2 microstructure), and copolymers thereof, such as styrene/butadiene copolymer and styrene/isoprene copolymer. Such hydrocarbons also include polymeric compounds such as polypentenamer, polyoctenamer, and other polymers prepared by cyclic olefin metathesis; diene oligomers such as squalene; and polymers or copolymers with unsaturation derived from dicyclopentadiene, norbornadiene, 5-ethylidene-2-norbornene, 5-vinyl-2-norbornene, 4-vinylcyclohexene, 1,7-octadiene, or other monomers containing more than one carbon-carbon double bond (conjugated or non-conjugated).

Examples of substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds, and unsaturated fatty acids such as oleic, ricinoleic, dehydrated ricinoleic, and linoleic acids and derivatives thereof, e.g. esters. Specific examples also include esters or polyesters of functionalized unsaturated hydrocarbons such as hydroxy terminated polybutadiene. Such hydrocarbons also include polymers or copolymers derived from (meth)allyl (meth)acrylates. Suitable oxygen scavenging polymers can be made by trans-esterification. Such polymers are disclosed in U.S. Pat. No. 5,859,145 (Ching et al.) (Chevron Research and Technology Company), incorporated herein by reference as if set forth in full. The composition used may also comprise a mixture of two or more of the substituted or unsubstituted ethylenically unsaturated hydrocarbons described above. While a weight average molecular weight of 1,000 or more is beneficial, an ethylenically unsaturated hydrocarbon having a lower molecular weight is also usable, especially if it is blended with a film-forming polymer or blend of polymers.

An additional example of oxygen scavengers which can be used in connection with this invention are disclosed in PCT patent publication WO 99/48963 (Chevron Chemical et al.), incorporated herein by reference in its entirety. These oxygen scavengers include a polymer or oligomer having at least one cyclohexene group or functionality. These oxygen scavengers include a polymer having a polymeric backbone, cyclic olefinic pendent group, and linking group linking the olefinic pendent group to the polymeric backbone.

An oxygen scavenging composition suitable for use with the invention comprises:

(a) a polymer or lower molecular weight material containing substituted cyclohexene functionality according to the following diagram:

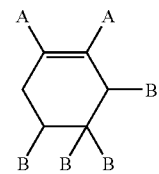

where A may be hydrogen or methyl and either one or two of the B groups is a heteroatom-containing linkage which attaches the cyclohexene ring to the said material, and wherein the remaining B groups are hydrogen or methyl;

(b) a transition metal catalyst; and (c) a photoinitiator.

The compositions may be polymeric in nature or they may be lower molecular weight materials. In either case, they may be blended with further polymers or other additives. In the case of low molecular weight materials, they will most likely be compounded with a carrier resin before use.

Also suitable for use in the present invention is the oxygen scavenger of U.S. Pat. No. 6,255,248 (Bansleben et al.), incorporated herein by reference in its entirety, which discloses a copolymer of ethylene and a strained, cyclic alkylene, preferably cyclopentene; and a transition metal catalyst.

Another oxygen scavenger, which can be used in connection with this invention is the oxygen scavenger of U.S. Pat. No. 6,214,254 (Gauthier et al.), incorporated herein by reference in its entirety, which discloses ethylene/vinyl aralkyl copolymer and a transition metal catalyst.

Transition Metal Catalysts

As indicated above, the ethylenically unsaturated hydrocarbon is combined with a transition metal catalyst. Suitable metal catalysts are those that can readily interconvert between at least two oxidation states.

The catalyst can be in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium II or III. The oxidation state of the metal when introduced is not necessarily that of the active form. Suitable counterions for the metal include, but are not limited to, chloride, acetate, stearate, palmitate, caprylate, linoleate, tallate, 2-ethylhexanoate, neodecanoate, oleate or naphthenate. Useful salts include cobalt (II) 2-ethylhexanoate, cobalt stearate, and cobalt (II) neodecanoate. The metal salt may also be an ionomer, in which case a polymeric counterion is employed. Such ionomers are well known in the art.

Any of the above-mentioned oxygen scavengers and transition metal catalyst can be further combined with one or more polymeric carriers, such as thermoplastic polymers, which are typically used to form film layers in plastic packaging articles. In the manufacture of certain embodiments of the invention, it will be particularly advantageous to use the higher melting polymer, which is selected from high-density polyethylene, polypropylene or a propylene copolymer, as the polymeric carrier for the transition metal catalyst and any optional photoinitiator.

Further additives can also be included in the composition to impart properties desired for the particular article being manufactured. Such additives include, but are not necessarily limited to, fillers, pigments, dyestuffs, antioxidants, stabilizers, processing aids, plasticizers, fire retardants,etc.

The mixing of the components listed above can be accomplished by melt blending at a temperature in the range of 50° C. to 300° C. However, alternatives such as the use of a solvent followed by evaporation may also be employed.

Photoinitiators

Some of the materials useful in connection with the invention include:
- 1,3,5-tris(4-benzoylphenyl)benzene (BBP$^3$)
- isopropylthioxanthone (ITX)
- bis(2,4,6-trimethylbenzoyl)phenylphosphineoxide (IRGACURE® 819)
- 2,4,6-trimethylbenzoyldiphenylphosphine oxide
- ethyl-2,4,6-trimethylbenzoylphenyl phosphinate
- bis(2,6-dimethoxybenzoyl)-2,4,4-trimethylpentyl phosphine oxide
- 4,4'-benzoylmethyl diphenyl sulfide (BMS)

The amount of photoinitiator can depend on the amount and type of unsaturation present in the polymer, the wavelength and intensity of radiation used; the nature and amount of antioxidants used; and the type of photoinitiator used.

EXAMPLES

Several prophetic film structures in accordance with the invention are identified below. "HDPE" is high density polyethylene; "PP" is polypropylene; "EPC" is propylene copolymer with a comonomer such as ethylene, butene, or other olefin; "OS" is an oxygen scavenger; "EAO" is ethylene/alpha olefin copolymer; "OB" is oxygen barrier; "PE" is ethylene homopolymer or copolymer, such as low density polyethylene or ethylene/alpha olefin copolymer; "ADH" is adhesive, such as polymeric adhesive; and "NYLON" is a polyamide or copolyamide. The gauge of each layer of each film, in mils (1 mil=0.001 inches) is indicated underneath the respective layers in each film example.

Film Structure A.

| EAO | OS + HDPE |
|---|---|
| 0.25 | 0.75 |

Film Structure B.

| EAO | OS + EPC |
|---|---|
| 0.25 | 0.75 |

Film Structure C.

| EAO + HDPE | OS + HDPE |
|---|---|
| 0.25 | 0.75 |

Film Structure D.

| EAO + EPC | OS + EPC |
|---|---|
| 0.25 | 0.75 |

Film Structure E.

| EAO + HDPE | OS + EPC |
|---|---|
| 0.25 | 0.75 |

Film Structure F.

| EAO + EPC | OS + HDPE |
|---|---|
| 0.25 | 0.75 |

Film Structure G.

| EAO | OS + HDPE | PE |
|---|---|---|
| 0.25 | 0.75 | 0.50 |

Film Structure H.

| EAO | OS + EPC | PE |
|---|---|---|
| 0.25 | 0.75 | 0.50 |

Film Structure I.

| EAO + HDPE | OS + HDPE | PE |
|---|---|---|
| 0.25 | 0.75 | 0.50 |

Film Structure J.

| EAO + EPC | OS + EPC | PE |
|---|---|---|
| 0.25 | 0.75 | 0.50 |

Film Structure K.

| EAO + HDPE | OS + EPC | PE |
|---|---|---|
| 0.25 | 0.75 | 0.50 |

Film Structure L.

| EAO + EPC | OS + HDPE | PE |
|---|---|---|
| 0.25 | 0.75 | 0.50 |

Film Structure M.

| EAO | OS + HDPE | PE | OB |
|---|---|---|---|
| 0.25 | 0.75 | 0.50 | 0.25 |

-continued

| Film Structure N. | | | |
|---|---|---|---|
| EAO | OS + EPC | PE | OB |
| 0.25 | 0.75 | 0.50 | 0.25 |

| Film Structure O. | | | |
|---|---|---|---|
| EAO + HDPE | OS + HDPE | PE | OB |
| 0.25 | 0.75 | 0.50 | 0.25 |

| Film Structure P. | | | |
|---|---|---|---|
| EAO + EPC | OS + EPC | PE | OB |
| 0.25 | 0.75 | 0.50 | 0.25 |

| Film Structure Q. | | | |
|---|---|---|---|
| EAO + HDPE | OS + EPC | PE | OB |
| 0.25 | 0.75 | 0.50 | 0.25 |

| Film Structure R. | | | |
|---|---|---|---|
| EAO + EPC | OS + HDPE | PE | OB |
| 0.25 | 0.75 | 0.50 | 0.25 |

Films comprising PET (poly(ethylene terephthalate) are shown adhered by lamination, such as adhesive lamination, or any other suitable means to the PE layer of the film (see Film structures S through X).

In some embodiments, a functional barrier layer, comprising HDPE, PP, or EPC, can be included in the film of the invention. This functional barrier layer is disposed between the oxygen scavenger layer and the sealant layer. Following are prophetic examples of such film structures.

| Film Structure AA. | | |
|---|---|---|
| EAO | HDPE | OS + HDPE |
| 0.25 | 0.25 | 0.75 |

| Film Structure BB. | | |
|---|---|---|
| EAO | EPC | OS + EPC |
| 0.25 | 0.25 | 0.75 |

| Film Structure CC. | | |
|---|---|---|
| EAO + HDPE | HDPE | OS + HDPE |
| 0.25 | 0.25 | 0.75 |

| Film Structure DD. | | |
|---|---|---|
| EAO + EPC | EPC | OS + EPC |
| 0.25 | 0.25 | 0.75 |

| Film Structure S. | | | | | | | | |
|---|---|---|---|---|---|---|---|---|
| EAO | OS + HDPE | ADH | NYLON | OB1 | NYLON | ADH | PE | PET |
| 0.25 | 0.75 | 0.20 | 0.20 | 0.25 | 0.20 | 0.20 | 0.25 | 0.50 |

| Film Structure T. | | | | | | | | |
|---|---|---|---|---|---|---|---|---|
| EAO | OS + EPC | ADH | NYLON | OB1 | NYLON | ADH | PE | PET |
| 0.25 | 0.75 | 0.20 | 0.20 | 0.25 | 0.20 | 0.20 | 0.25 | 0.50 |

| Film Structure U. | | | | | | | | |
|---|---|---|---|---|---|---|---|---|
| EAO + HDPE | OS + HDPE | ADH | NYLON | OB1 | NYLON | ADH | PE | PET |
| 0.25 | 0.75 | 0.20 | 0.20 | 0.25 | 0.20 | 0.20 | 0.25 | 0.50 |

| Film Structure V. | | | | | | | | |
|---|---|---|---|---|---|---|---|---|
| EAO + EPC | OS + EPC | ADH | NYLON | OB1 | NYLON | ADH | PE | PET |
| 0.25 | 0.75 | 0.20 | 0.20 | 0.25 | 0.20 | 0.20 | 0.25 | 0.50 |

| Film Structure W. | | | | | | | | |
|---|---|---|---|---|---|---|---|---|
| EAO + HDPE | OS + EPC | ADH | NYLON | OB1 | NYLON | ADH | PE | PET |
| 0.25 | 0.75 | 0.20 | 0.20 | 0.25 | 0.20 | 0.20 | 0.25 | 0.50 |

| Film Structure X. | | | | | | | | |
|---|---|---|---|---|---|---|---|---|
| EAO + EPC | OS + HDPE | ADH | NYLON | OB1 | NYLON | ADH | PE | PET |
| 0.25 | 0.75 | 0.20 | 0.20 | 0.25 | 0.20 | 0.20 | 0.25 | 0.50 |

-continued

Film Structure EE.

| EAO + HDPE | HDPE | OS + EPC |
|---|---|---|
| 0.25 | 0.25 | 0.75 |

Film Structure FF.

| EAO + EPC | EPC | OS + HDPE |
|---|---|---|
| 0.25 | 0.25 | 0.75 |

Film Structure GG.

| EAO | HDPE | OS + HDPE | PE |
|---|---|---|---|
| 0.25 | 0.25 | 0.75 | 0.50 |

Film Structure HH.

| EAO | EPC | OS + EPC | PE |
|---|---|---|---|
| 0.25 | 0.25 | 0.75 | 0.50 |

Film Structure II.

| EAO + HDPE | HDPE | OS + HDPE | PE |
|---|---|---|---|
| 0.25 | 0.25 | 0.75 | 0.50 |

Film Structure JJ.

| EAO + EPC | EPC | OS + EPC | PE |
|---|---|---|---|
| 0.25 | 0.25 | 0.75 | 0.50 |

Film Structure KK.

| EAO + HDPE | HDPE | OS + EPC | PE |
|---|---|---|---|
| 0.25 | 0.25 | 0.75 | 0.50 |

Film Structure LL.

| EAO + EPC | EPC | OS + HDPE | PE |
|---|---|---|---|
| 0.25 | 0.25 | 0.75 | 0.50 |

Film Structure MM.

| EAO | HDPE | OS + HDPE | PE | OB |
|---|---|---|---|---|
| 0.25 | 0.25 | 0.75 | 0.50 | 0.25 |

Film Structure NN.

| EAO | EPC | OS + EPC | PE | OB |
|---|---|---|---|---|
| 0.25 | 0.25 | 0.75 | 0.50 | 0.25 |

Film Structure OO.

| EAO + HDPE | HDPE | OS + HDPE | PE | OB |
|---|---|---|---|---|
| 0.25 | 0.25 | 0.75 | 0.50 | 0.25 |

Film Structure PP.

| EAO + EPC | EPC | OS + EPC | PE | OB |
|---|---|---|---|---|
| 0.25 | 0.25 | 0.75 | 0.50 | 0.25 |

Film Structure QQ.

| EAO + HDPE | HDPE | OS + EPC | PE | OB |
|---|---|---|---|---|
| 0.25 | 0.25 | 0.75 | 0.50 | 0.25 |

Film Structure RR.

| EAO + EPC | EPC | OS + HDPE | PE | OB |
|---|---|---|---|---|
| 0.25 | 0.25 | 0.75 | 0.50 | 0.25 |

In additional embodiments, films like those of Film structures S through X can be made, but including a functional barrier layer comprising HDPE, PP, and/or EPC, the functional barrier layer disposed between the layer comprising the oxygen scavenger, and the sealant layer.

In the above examples, where EPC is indicated, polypropylene (PP) can be used instead or in addition to the EPC.

The HDPE, PP, and/or EPC can in one embodiment be included in the oxygen scavenger layer, and not be present in a layer separate from the oxygen scavenger layer.

The HDPE, PP, and/or EPC can in another embodiment be included in the oxygen scavenger layer, and additionally present in the sealant layer, i.e. the layer furthest to the left in the above examples.

The HDPE, PP, and/or EPC can in yet another embodiment be included in the oxygen scavenger layer, and additionally present "neat", i.e. without the addition of significant amounts of other materials in the same layer, in a layer disposed between the oxygen scavenger layer and the sealant layer. This neat layer can serve as a functional barrier layer to by-products of the oxygen scavenging reaction.

This neat layer can be disposed in one embodiment adjacent the oxygen scavenger layer.

In another embodiment, this neat layer can be adjacent the sealant layer.

In yet another embodiment, this neat layer can be adjacent the oxygen scavenger layer, as well as adjacent the sealant layer.

In one embodiment, all three of the oxygen scavenger layer, neat layer, and sealant layer can include HDPE, PP, and/or EPC.

In one embodiment, the functional barrier layer can include an additional polymer, different from the HDPE, PP, and/or EPC, such as polyolefin such as ethylene homopolymer or copolymer.

When EMCM or other oxygen scavengers are used to scavenge oxygen from the headspace of a package or container, it is beneficial that the layer(s) containing the HDPE, PP, and/or EPC have a sufficient high oxygen permeability (oxygen transmission rate) to allow the oxygen from the headspace to move through the film structure to the oxygen scavenger layer at a sufficient rate. With increasing thickness of the HDPE, PP, and/or EPC containing layers, the presence of increasing amounts of blended polyolefin will aid in controlling the overall oxygen transmission rate of the layer.

Additional materials, including polymeric materials or other organic or inorganic additives, can be added to any or all of the layers of the above structures as needed, and additional film layers can be included either within the film structure, or adhered to an outer layer thereof.

Film as described herein can be produced by any suitable method, including coextrusion, extrusion coating, lamination, extrusion lamination, etc.

The side of the PE layer of structures S through X, i.e. that side of the layer that will adhere to the PET film, can alternatively be adhered to another polymer, to paperboard, or to foil such as metal foil.

Films useful in connection with the invention can have any suitable number of layers, such as a total of from 2 to 20 layers.

In general, the film can have any total thickness desired, and each layer can have any thickness desired, so long as the film provides the desired properties for the particular packaging operation in which the film is used. Typical total thicknesses are from 0.5 mils to 15 mils, such as 1 mil to 12 mils, such as 2 mils to 10 mils, 3 mils to 8 mils, and 4 mils to 6 mils.

In the above film structures, the interface between the oxygen barrier layer and the oxygen scavenger layer will typically include an adhesive or tie layer, such as one of the polymeric adhesives described herein.

The invention is not limited to the illustrations described herein, which are deemed to be merely illustrative, and susceptible of modification of form, size, arrangement of parts and details of operation.

The following film structures in accordance with the invention were made by a conventional coextrusion and adhesive lamination process.

Materials used were as follows.

TABLE 1

| Resin Identification | | |
|---|---|---|
| Material Code | Tradename Or Designation | Source(s) |
| PE1 | PE4517 ™ | Chevron Philips |
| PE2 | DOWLEX ™ 2045 | Dow |
| PE3 | ATTANE ™ 4202 | Dow |
| PE4 | M6020 ™ | Equistar |
| PE5 | PE1042CS15 ™ | Huntsman |
| PE1 tie | PX2049 ™ | Equistar |
| PE2 tie | TYMOR ™ 1203 | Rohm &Haas |
| AB1 | 10853 ™ | Ampacet |
| AB2 | 10414-08 ™ Deodorant | Colortech |
| AB3 | POLYBATCH ™ AB 5 | A. Schulman |
| MPE1 | AFFINITY PL1850G ™ | Dow |
| MPE2 | EXACT ™ 4150 | ExxonMobil |
| MPE3 | EXCEED ™ 4518PA | ExxonMobil |
| MPE4 | AFFINITY ™ PL 1280G | Dow |
| EMA1 | SP2260 ™ | Voridian |
| EVA1 | ESCORENE ™ LD-318.92 | ExxonMobil |
| EVA2 | — | Inhouse blend |
| EVA tie | PLEXAR ™ PX1007 | Equistar |
| PA1 | ULTRAMID ™ B 3301 | BASF |
| PA2 | GRIVORY ™ G21 | EMS-Chemie |
| OB1 | SOARNOL ™ ET3803 | Nippon Gohsei |
| OS1 | OSP500R ™ or DS4713R ™ | Chevron Phillips |
| OSM1 | OSP100M ™ | Chevron Phillips |
| OSM2 | — | — |
| OSM3 | — | — |
| PET1 | TERPHANE ™ 22.00 | Terphane |
| PET2 | MYLAR ™ 822 or HOSTAPHAN ™ 2PA7N | DuPont or Mitsubishi |
| EPC1 | ELTEX ™ P KS 409 | Innovene |
| EPC2 | ESCORENE ™ PP-9302 E1 | ExxonMobil |
| EPC3 | PRO-FAX ™ SA861 | Basell |
| EPC4 | Z9450 ™ | Total |
| EPC5 | MARLEX ™ JM 97A | Chevron Phillips |
| EPC6 | PRO-FAX ™ SR257M | Basell |
| EPC7 | 8473 ™ | Total |
| SLIP1 | MB50-313 ™ | Dow Corning |
| IO1 | SURLYN ™ 1650 | DuPont |
| PP tie | ADMER ™ QB510A | Mitsui |
| PMB1 | — | — |
| PMB2 | — | — |
| PMB3 | — | — |
| PMB4 | — | — |
| PMB5 | — | — |
| PMB6 | — | — |
| PMB7 | — | — |

PE1 is a low density polyethylene resin.
PE2 is LLDPE, which in this case is an ethylene/1-octene copolymer with a density of 0.920 gm/cc and an octene-1 comonomer content of 6.5%.
PE3 is a heterogeneous ethylene octene copolymer having a density of 0.912 g/cc.
PE4 is a high density polyethylene resin having a density of 0.957 g/cc.
PE5 is a low density polyethylene resin.
PE1 tie is an anhydride-grafted high density polyethylene.
PE2 tie is LLDPE (ethylene/butene-1 copolymer) blended with maleic anhydride modified polyethylene and an ethylene/propylene rubber.
AB1 is a masterbatch having about 80% linear low density polyethylene, and about 20% of an antiblocking agent (diatomaceous earth).
AB2 is a blend of 80% low density polyethylene and 20% zeolite.
AB3 is a blend of low density polyethylene and amorphous silica.
MPE1 is a metallocene catalyzed ethylene/1-octene copolymer with a density of 0.902 grams/cubic centimeter, where the octene comonomer forms about 12% by weight of the copolymer.
MPE2 is a single site catalyzed ethylene/1-hexene copolymer with a density of 0.895 grams/cubic centimeter.
MPE3 is a single site catalyzed ethylene/1-hexene copolymer with a density of 0.917 grams/cubic centimeter.
MPE4 is a single site catalyzed ethylene/1-octene copolymer with a density of 0.9 grams/cubic centimeter, where the octene comonomer forms about 13% by weight of the copolymer.
EMA1 is an ethylene/methyl acrylate copolymer.
EVA1 is ethylene/vinyl acetate copolymer with 9 weight % vinyl acetate comonomer by weight of the copolymer.
EVA2 is a blend of 70% ethylene/vinyl acetate copolymer, 10% EVA processing aid, and 20% zeolite.
EVA tie is maleic anhydride-modified ethylene/vinyl acetate copolymer.
PA1 is 80% polycaprolactam and 20%. amorphous polyamide.
PA2 is amorphous polyamide derived from hexamethylene diamine, isophthalic acid, and terephthalic acid.
OB1 is ethylene/vinyl alcohol copolymer.
OS1 is an oxygen scavenger resin, poly(ethylene/methyl acrylate/cyclohexene methyl acrylate) (abbreviated as EMCM).
OSM1 is an oxygen scavenging masterbatch produced from a carrier resin (ethylene/methyl acrylate), with 1%, by weight of the masterbatch, of cobalt present in a prill (solid) cobalt oleate, and 1%, by weight of the masterbatch, of tribenzoyl triphenyl benzene (1,3,5-tris(4-benzoylphenyl)benzene).
OSM2 is an oxygen scavenging masterbatch produced from high density polyethylene carrier resin (d = 0.957 g/cc, $T_m$ = 134° C.) of cobalt present as cobalt oleate, tribenzoyl triphenyl benzene (1,3,5-tris(4-benzoylphenyl)benzene), and isopropylthioxanthone (ITX).
OSM3 is a photoinitiator masterbatch produced from poly(ethylene/methyl acrylate/cyclohexene methyl acrylate) and ITX.
PET1 is a PVDC coated polyethylene terephthalate film.
PET2 is a polyethylene terephthalate film.
EPC1 is propylene/ethylene copolymer.
EPC2 is propylene/ethylene copolymer.
EPC3 is a single site catalyzed propylene/ethylene copolymer.
EPC4 is a single site catalyzed propylene/ethylene copolymer.
EPC5 is a Zeigler/Natta catalyzed propylene/ethylene copolymer.

TABLE 1-continued

Resin Identification

| Material Code | Tradename Or Designation | Source(s) |
|---|---|---|

EPC6 is a Zeigler/Natta catalyzed propylene/ethylene copolymer.
EPC7 is a Zeigler/Natta catalyzed propylene/ethylene copolymer.
SLIP1 is ultra high molecular weight siloxane in LLDPE.
IO1 is an ionomer resin, specifically a zinc-neutralized ethylene methacrylic acid co-polymer.
PP tie is a maleic anhydride-grafted polypropylene.
PMB1 is a masterbatch having a carrier resin which is a high density polyethylene, and small amounts (1% or less) of transition metal catalyst and photoinitiator.
PMB2 is a masterbatch having a carrier resin which is a high density polyethylene, and small amounts (1% or less) of transition metal catalyst and photoinitiator.
PMB3 is a masterbatch having a carrier resin which is a high density polyethylene (PE4), and small amounts (1% or less) of transition metal catalyst and photoinitiator.
PMB4 is a masterbatch having a carrier resin which is a high density polyethylene, and small amounts (1% or less) of transition metal catalyst and photoinitiator.
PMB5 is a masterbatch having a carrier resin which is a high density polyethylene, the resin making up 96% of the masterbatch, and 4% of a blend of 90% EMA1 and 10% of a photoinitiator.
PMB6 is a masterbatch having a carrier resin which is a high density polyethylene (PE4), the resin making up about 98% of the masterbatch, and 1% of a transition metal catalyst, and about 1% of a photoinitiator.
PMB7 is a masterbatch having a carrier resin which is a high density polyethylene, the resin making up about 98% of the masterbatch, and 1% of a transition metal catalyst, and about 1% of a photoinitiator.

All compositional percentages given herein are by weight, unless indicated otherwise.

Hot tack values are reported in Newtons/inch at the specified temperature, per ASTM F 1921-98, using either a Theller hot tack tester (method A) or a Topwave DTC hot tack tester (method B).

An internal test was also developed to measure the inter ply adhesion of oxygen scavenging films, known as the "Multivac" test which is described below.

The following films were made by conventional coextrusion and adhesive lamination techniques. Films designated Comp. 1 and Comp. 2 are presented for comparative purposes.

In Table 2, the thickness of each layer is indicated below the indication of the composition of each layer.

For the "Multivac" test, packages were formed on a Multivac R230 equipped with a Cryovac Model 4104 Scavenging Initiation System (SIS). T6070B (Cryovac Inc.) forming material was used with an approximate pocket depth of four inches. All four banks of the SIS 4104 were energized to provide the lid stock an approximate cumulative UV dose of 750 mJ/cm$^2$.

The Multivac was programmed to seal packages with the sensor-controlled gas flush process. This program fills packages with the target gas (nitrogen) until the pressure setting has been reached and the gas supply is switched off. Changes in the gas time were used to increase the amount of gas in packages and therefore the amount of pressure on the seals. This pressure on the seal takes place during the sealing step while film is hot. A seal temperature of 135° C. and a seal time of 1.5 seconds were used to insure film was sufficiently heated. Eight-ounce plastic blocks were loaded into pockets to simulate products and imparted additional strain on the seals. Individual packages were examined with and without blocks for the presence of inter-ply seal failures.

TABLE 2

Working Example

| | sealant 88% MPE1 + 8% AB1 + 4% SLIP1 | 90% OS1 + 10% OSM1 | EVA tie | 80% PA1 + 20% PA2 | EVOH | 80% PA1 + 20% PA2 | EVA tie | PE5 | PET2 |
|---|---|---|---|---|---|---|---|---|---|
| COMP. 1 | 0.25 | 0.75 | 0.18 | 0.18 | 0.25 | 0.2 | 0.2 | 0.5 | 0.46 |
| | | 93% PE3 + 7% AB1 | 90% OS1 + 10% OSM1 | | 90% OS1 + 10% OSM1 | | PE2 | PET1 | |
| COMP. 2 | | 0.25 | 0.25 | | 0.50 | | 1.50 | 0.54 | |
| | 66% MPE4 + 20% EPC1 + 10% AB2 + 4% SLIP1 | 75% OS1 + 15% PE4 + 10% OSM1 | EVA tie | 80% PA1 + 20% PA2 | EVOH | 80% PA1 + 20% PA2 | EVA tie | PE5 | PET2 |
| EX. 1 | 0.25 | 0.75 | 0.18 | 0.18 | 0.25 | 0.19 | 0.20 | 0.50 | 0.46 |

TABLE 3

| Structure | Seal Temp (° C.) | Seal Time (sec) | Gas Time 0.2 Delam | Gas Time 0.2 Filled Delam | Gas Time 0.3 Delam | Gas Time 0.3 Filled Delam | Gas Time 0.35 Delam | Gas Time 0.35 Filled Delam |
|---|---|---|---|---|---|---|---|---|
| Comp. 1 | 135 | 1.5 | No | Yes | — | — | — | — |
| Comp. 2 | 135 | 1.5 | No | Yes | — | — | — | — |
| EX. 1 | 135 | 1.5 | No | No | Yes | Yes | — | — |

Hot tack strengths and oxygen scavenging rates for the film of Example 1 is shown in Table 4 along with comparative example 1 and comparative example 2. Hot tack was measured using both a DTC and a Theller type instrument under a variety of conditions as noted in the table.

To determine the oxygen scavenging rate of the films, two methods were used to evaluate the films. In both cases, film samples were UV irradiated with a Cryovac Model 4104™ Scavenging Initiation System (SIS) unit delivering a dose of about 600-800 mJ/cm² of UVC. In one method, irradiated films of well-defined area (usually 200 cm²) were vacuum packaged in barrier pouches (P 640B, Cryovac® division of Sealed Air Corp., Oxygen Transmission Rate (OTR)=5 cc/m²/day). The pouches were immediately inflated with 300 cc of nitrogen atmosphere at about 1% residual oxygen. In the second method, a Multivac R230™ packaging machine, equipped with a Cryovac Model 4104 SIS unit was used with the sample films as the lid stock and bottom web (T6070B™, Cryovac Division of Sealed Air Corp.) to prepare lidded packages of about 450 cc. Gas flushing with the same 1% residual oxygen was also utilized. In all cases, samples were then stored at from 4 to 5° C. (refrigerated) for the duration of the test. Portions of the headspace were periodically withdrawn and analyzed for oxygen with a Mocon PACCHECK™ Model 400 or 450 oxygen analyzer. The average oxygen scavenging rate is calculated by considering only the end data points, with the following formula: Average Rate=cc $O_2$ scavenged/($m^2$·day), and in these examples was calculated 4 days after UV triggering. The peak (instantaneous) rate is the highest scavenging rate observed over any sampling period, and is given by: $\Delta$ cc $O_2$ scavenged /($m^2$·$\Delta$day), where $\Delta$ is the incremental change between two consecutive measurements. Measurements are typically taken on the day of triggering (time =0) and after 1, 4, 7, 14, and 21 days. Rates are further reported as the mean of at least three replicates.

TABLE 4

Hot Tack and Oxygen Scavenging Rate

| Example | DTC (130° C.)[a] N/in, std. Dev. | DTC (135° C.)[b] N/in, std. Dev. | DTC (110° C.)[c] N/in, std. Dev. | Theller (135° C.)[d] N/in, std. Dev. | Theller (110° C.)[e] N/in, std. Dev. | Refrigerated Oxygen Scavenging Rate (1% initial $O_2$) Avg. | Refrigerated Oxygen Scavenging Rate (1% initial $O_2$) Peak |
|---|---|---|---|---|---|---|---|
| COMP. 1 | 3.1, 0.5 | 0.2, 0.3 | 0.4, 0.2 | 1.5, 0.6 | 1.6, 0.8 | 31.6 | 60.1 |
| COMP. 2 | 3.6, 0.86 | 2.7, 0.2 | 2.2, 0.1 | 2.1, 0.2 | 3.4, 0.4 | 27.1 | 44.3 |
| EX. 1 | | 3.6, 0.3 | 2.9, 0.4 | NA | NA | 37.6 | 69.1 |

[a]Conditions: seal temp. = 130° C., seal time = 2.5 sec., seal force = 80 N, delay time 1.3 sec, peel rate 200 mm/sec.
[b]Conditions: seal temp. = 135° C., seal time = 1.5 sec., seal force = 120 N, delay time 0.25 sec, peel rate 100 mm/sec.
[c]Conditions: seal temp. = 110° C., seal time = 1.5 sec., seal force = 120 N, delay time 0.25 sec, peel rate 100 mm/sec.
[d]Conditions: seal temp. = 135° C., seal time = 1.5 sec., seal force = 267 psi, delay time 0.25 sec, peel rate 200 cm/min.
[e]Conditions: seal temp. = 110° C., seal time = 1.5 sec., seal force = 267 psi, delay time 0.25 sec, peel rate 200 cm/min.

Additional film structures were produced in accordance with the invention. These are shown in Table 5.

TABLE 5

Barrier Blown Film Compositions

| Ex. 2 | Sealant/ outside 66% MPE1 + 20% EPC1 + 10% AB2 + 4% SLIP1 | 85% OS1 + 10% PMB1 + 5% PE4 | EVA TIE | 80% PA1 + 20% PA2 | OB1 | 80% PA1 + 20% PA2 | EVA TIE | Bulk/ in PE5 |
|---|---|---|---|---|---|---|---|---|
| 3.2 | 0.25 | 0.75 | 0.18 | 0.18 | 0.25 | 0.19 | 0.20 | 0.50 |

TABLE 5-continued

Barrier Blown Film Compositions

| | Sealant/outside | | | | | | | | Bulk/in |
|---|---|---|---|---|---|---|---|---|---|
| Ex. 3 | 66% MPE1 + 20% EPC1 + 10% AB2 + 4% SLIP1 | 85% OS1 + 10% PMB2 + 5% PE4 | EVA TIE | 80% PA1 + 20% PA2 | OB1 | 80% PA1 + 20% PA2 | EVA TIE | PE5 |
| | 2.6 | 0.25 | 0.75 | 0.18 | 0.18 | 0.25 | 0.19 | 0.20 | 0.50 |
| Ex. 4 | 66% MPE1 + 20% EPC1 + 10% AB2 + 4% SLIP1 | 85% OS1 + 10% PMB3 + 5% PE4 | EVA TIE | 80% PA1 + 20% PA2 | OB1 | 80% PA1 + 20% PA2 | EVA TIE | PE5 |
| | 3.4 | 0.25 | 0.75 | 0.18 | 0.18 | 0.25 | 0.19 | 0.20 | 0.50 |
| Ex. 5 | 66% MPE4 + 20% EPC1 + 10% AB2 + 4% SLIP1 | 75% OS1 + 15% PE4 + 10% OSM1 | EVA TIE | 80% PA1 + 20% PA2 | OB1 | 80% PA1 + 20% PA2 | EVA TIE | PE5 |
| | 3.6 | 0.25 | 0.75 | 0.18 | 0.18 | 0.25 | 0.19 | 0.20 | 0.50 |
| Ex. 6 | 66% MPE4 + 20% EPC1 + 10% AB2 + 4% SLIP1 | 75% OS1 + 15% PE4 + 10% OSM1 | PE1 TIE | 80% PA1 + 20% PA2 | OB1 | 80% PA1 + 20% PA2 | PE1 TIE | PE5 |
| | 3.1 | 0.25 | 0.85 | 0.18 | 0.18 | 0.25 | 0.19 | 0.20 | 0.40 |
| Ex. 7 | 66% MPE4 + 20% EPC1 + 10% AB2 + 4% SLIP1 | 75% OS1 + 15% PE4 + 10% OSM1 | PP TIE | 80% PA1 + 20% PA2 | OB1 | 80% PA1 + 20% PA2 | PP TIE | PE5 |
| | 2.8 | 0.25 | 0.85 | 0.18 | 0.18 | 0.25 | 0.19 | 0.20 | 0.40 |
| Ex. 8 | 66% MPE4 + 20% EPC1 + 10% AB2 + 4% SLIP1 | 75% OS1 + 15% PE4 + 10% OSM1 | IO1 | 80% PA1 + 20% PA2 | OB1 | 80% PA1 + 20% PA2 | IO1 | PE5 |
| | 3.4 | 0.25 | 0.85 | 0.18 | 0.18 | 0.25 | 0.19 | 0.20 | 0.40 |
| Ex. 9 | 66% MPE1 + 20% EPC1 + 10% AB2 + 4% SLIP1 | 85% OS1 + 10% PMB4 + 5% PE4 | PE2 TIE | 80% PA1 + 20% PA2 | OB1 | 80% PA1 + 20% PA2 | PE2 TIE | PE5 |
| | — | 0.25 | 0.75 | 0.18 | 0.18 | 0.25 | 0.19 | 0.20 | 0.50 |
| Ex. 10 | 66% MPE1 + 20% EPC1 + 10% AB2 + 4% SLIP1 | 85% OS1 + 10% PMB4 + 5% PE4 | PP TIE | 80% PA1 + 20% PA2 | OB1 | 80% PA1 + 20% PA2 | PP TIE | PE5 |
| | — | 0.25 | 0.75 | 0.18 | 0.18 | 0.25 | 0.19 | 0.20 | 0.50 |
| Ex. 11 | 66% MPE1 + 20% EPC1 + 10% AB2 + 4% SLIP1 | 85% OS1 + 10% PMB4 + 5% PE4 | EVA TIE | 80% PA1 + 20% PA2 | OB1 | 80% PA1 + 20% PA2 | EVA TIE | PE5 |
| | — | 0.25 | 0.75 | 0.18 | 0.18 | 0.25 | 0.19 | 0.20 | 0.50 |
| Ex. 12 | 66% MPE4 + 20% EPC1 + 10% AB2 + 4% SLIP1 | 85% OS1 + 10% PMB + 5% PMB5 | EVA TIE | 80% PA1 + 20% PA2 | OB1 | 80% PA1 + 20% PA2 | EVA TIE | PE5 |
| | 2.7 | 0.25 | 0.75 | 0.18 | 0.18 | 0.25 | 0.19 | 0.20 | 0.50 |

Notes:
1. Values below each Example indicate the hot tack strength measured in Newtons/inch, using DTC at 135° C. (ASTM F 1921-98). For instance, for the film of Example 2, the hot tack value was 3.2 Newtons/inch, using DTC at 135° C. (ASTM F 1921-98).

Additional film structures in accordance with the invention are shown in Table 6.

TABLE 6

| | | Sealant | |
|---|---|---|---|
| Ex. 13 | 65% MPE1 + 20% EPC1 + 10% AB2 + 5% SLIP1 | 85% OS1 + 15% PMB3 | PE1 |
| | 0.25 | 0.75 | 1.50 |
| Ex. 14 | 65% MPE1 + 20% EPC3 + 10% AB2 + 5% SLIP1 | 85% OS1 + 15% PMB3 | PE1 |
| | 0.25 | 0.75 | 1.50 |
| Ex. 15 | 65% MPE1 + 20% EPC4 + 10% AB2 + 5% SLIP1 | 85% OS1 + 15% PMB3 | PE1 |
| | 0.25 | 0.75 | 1.50 |
| Ex. 16 | 65% MPE1 + 20% EPC5 + 10% AB2 + 5% SLIP1 | 85% OS1 + 15% PMB3 | PE1 |
| | 0.25 | 0.75 | 1.50 |
| Ex. 17 | 65% MPE1 + 20% EPC6 + 10% AB2 + 5% SLIP1 | 85% OS1 + 15% PMB3 | PE1 |
| | 0.25 | 0.75 | 1.50 |
| Ex. 18 | 65% MPE1 + 20% EPC7 + 10% AB2 + 5% SLIP1 | 85% OS1 + 15% PMB3 | PE1 |
| | 0.25 | 0.75 | 1.50 |
| Ex. 19 | 65% MPE1 + 20% EPC1 + 10% AB2 + 5% SLIP1 | 90% OS1 + 10% PMB6 | PE1 |
| | 0.25 | 0.75 | 1.50 |
| Ex. 20 | 65% MPE1 + 20% EPC1 + 10% AB2 + 5% SLIP1 | 90% OS1 + 10% PMB7 | PE1 |
| | 0.25 | 0.75 | 1.50 |

Table 7 indicates the hot tack values and oxygen scavenging rate of the film structures of Table 6, as well as Examples 9 and 10 of the invention.

TABLE 7

| | Hot Tack Values and Oxygen Scavenging Rate | | | | | | |
|---|---|---|---|---|---|---|---|
| | DTC (130° C.)[a] N/in, | DTC (135° C.)[b] N/in, | DTC (110° C.)[c] N/in, | Theller (135° C.)[d] N/in, | Theller (110° C.)[e] N/in, | Refrigerated Oxygen Scavenging Rate (1% initial $O_2$) | |
| Example | std. Dev. | std. Dev. | std. Dev. | std. Dev. | std. Dev. | Avg. | Peak |
| EX. 9 | | 4.4, 0.3 | 2.2, 0.2 | 1.6, 0.1 | 2.1, 0.6 | 35.9 | 66.7 |
| EX. 10 | | 5.4, 0.3 | 3.8, 0.4 | 1.8, 0.1 | 2.6, 0.5 | 36.4 | 70.8 |
| Ex. 13 | NA | 6.2, 0.6 | 3.9, 0.6 | 3.7, 0.2 | 4.9, 0.2 | 31.9 | 62.6 |
| Ex. 14 | NA | 5.8, 0.2 | 1.9, 0.5 | 3.2, 0.1 | 3.5, 0.9 | 34.4 | 67.4 |
| Ex. 15 | NA | 4.1, 0.4 | 2.8, 0.5 | 2.0, 0.2 | 3.7, 0.5 | 35.8 | 68.3 |
| Ex. 16 | NA | 5.8, 0.7 | 2.8, 0.3 | 3.4, 0.4 | 4.9, 0.3 | 37.3 | 70.5 |
| Ex. 17 | NA | 5.2, 0.5 | 4.0, 0.4 | 2.6, 0.4 | 3.4, 1.0 | 35.4 | 51.5 |
| Ex. 18 | NA | 3.9, 0.4 | 2.1, 0.4 | 2.1, 0.2 | 3.2, 0.6 | 36.6 | 57.6 |
| Ex. 19 | NA | 3.4, 0.4 | 2.8, 0.6 | 1.7, 0.4 | 3.4, 0.2 | 36.4 | 52.2 |
| Ex. 20 | NA | 5.1, 0.3 | 4.4, 0.3 | 1.7, 0.1 | 3.5, 0.3 | — | — |

What is claimed is:

1. An oxygen scavenger film comprising:
   a) a layer comprising a blend of an oxygen scavenger and a polymer selected from the group consisting of high density polyethylene, polypropylene, and propylene copolymer, and
   b) a sealant layer;
   wherein the hot tack strength of the film is at least 2.0 Newtons/inch at 135° C., according to ASTM F 1921-98, measured with DTC instrumentation; and wherein at least one layer of the film is cross-linked.

2. The oxygen scavenger film of claim 1 wherein the sealant layer comprises a material selected from the group consisting of ethylene/alpha olefin copolymer, ethylene/vinyl acetate copolymer, ionomer resin, ethylene/acrylic or methacrylic acid copolymer, ethylene/acrylate or methacrylate copolymer, and low density polyethylene.

3. The oxygen scavenger film of claim 1 wherein the sealant layer is adjacent the layer comprising a blend of an oxygen scavenger and a polymer selected from the group consisting of high density polyethylene, polypropylene, and propylene copolymer.

4. The oxygen scavenger film of claim 1 comprising a layer comprising a polymer having an oxygen transmission rate of no more than 100 cc/$m^2$/24 hr at 25° C., 0% RH, 1 atm (ASTM D 3985).

5. The oxygen scavenger film of claim 1 wherein the oxygen scavenger comprises:
   a) an organic oxygen scavenger, and
   b) a transition metal catalyst.

6. The oxygen scavenger film of claim 5 wherein the organic oxygen scavenger comprises one or more materials selected from the group consisting of
   i) ethylenically unsaturated hydrocarbon,
   ii) a polymer having a polymeric backbone, cyclic olefinic pendent group, and linking group linking the olefinic pendent group to the polymeric backbone,
   iii) a copolymer of ethylene and a strained, cyclic alkylene, and
   iv) ethylene/vinyl aralkyl copolymer.

7. The oxygen scavenger film of claim 1 wherein the oxygen scavenger comprises a photoinitiator.

8. The oxygen scavenger film of claim 1 comprising a functional barrier layer disposed between the layer comprising a blend of an oxygen scavenger and a polymer selected from the group consisting of high density polyethylene, polypropylene, and propylene copolymer, and the sealant layer, the functional barrier layer comprising a polymer selected from the group consisting of high density polyethylene, polypropylene, and propylene copolymer.

9. An oxygen scavenger film comprising:
   a) a layer comprising a blend of an oxygen scavenger and high density polyethylene, and
   b) a sealant layer comprising propylene copolymer;
   wherein the hot tack strength of the film is at least 2.0 Newtons/inch at 135° C., according to ASTM F 1921-98, measured with DTC instrumentation.

10. The oxygen scavenger film of claim 9 wherein the sealant layer is adjacent the layer comprising a blend of an oxygen scavenger and high density polyethylene.

11. The oxygen scavenger film of claim 9 comprising a layer comprising a polymer having an oxygen transmission rate of no more than 100 cc/m$^2$/24hr at 25° C., 0% RH, 1 atm (ASTM D 3985).

12. The oxygen scavenger film of claim 9 wherein the oxygen scavenger comprises:
   a) an organic oxygen scavenger, and
   b) a transition metal catalyst.

13. The oxygen scavenger film of claim 12 wherein the organic oxygen scavenger comprises one or more materials selected from the group consisting of
   i) ethylenically unsaturated hydrocarbon,
   ii) a polymer having a polymeric backbone, cyclic olefinic pendent group, and linking group linking the olefinic pendent group to the polymeric backbone,
   iii) a copolymer of ethylene and a strained, cyclic alkylene, and
   iv) ethylene/vinyl aralkyl copolymer.

14. The oxygen scavenger film of claim 9 wherein the oxygen scavenger comprises a photoinitiator.

15. The oxygen scavenger film of claim 9 comprising a functional barrier layer disposed between the layer comprising a blend of an oxygen scavenger and high density polyethylene, and the sealant layer, the functional barrier layer comprising a polymer selected from the group consisting of high density polyethylene, polypropylene, and propylene copolymer.

16. An oxygen scavenger film comprising:
   a) a layer comprising a blend of an oxygen scavenger and a polymer selected from the group consisting of high density polyethylene, polypropylene, and propylene copolymer, and
   c) a sealant layer;
   wherein the hot tack strength of the film is at least 2.0 Newtons/inch at 135° C., according to ASTM F 1921-98, measured with DTC instrumentation; and wherein the film is heat shrinkable.

17. The oxygen scavenger film of claim 16 wherein the sealant layer comprises a material selected from the group consisting of ethylene/alpha olefin copolymer, ethylene/vinyl acetate copolymer, ionomer resin, ethylene/acrylic or methacrylic acid copolymer, ethylene/acrylate or methacrylate copolymer, and low density polyethylene.

18. The oxygen scavenger film of claim 16 wherein the sealant layer is adjacent the layer comprising a blend of an oxygen scavenger and a polymer selected from the group consisting of high density polyethylene, polypropylene, and propylene copolymer.

19. The oxygen scavenger film of claim 16 comprising a layer comprising a polymer having an oxygen transmission rate of no more than 100 cc/m$^2$/24 hr at 25° C., 0% RH, 1 atm (ASTM D 3985).

20. The oxygen scavenger film of claim 16 wherein the oxygen scavenger comprises:
   a) an organic oxygen scavenger, and
   b) a transition metal catalyst.

21. The oxygen scavenger film of claim 20 wherein the organic oxygen scavenger comprises one or more materials selected from the group consisting of
   i) ethylenically unsaturated hydrocarbon,
   ii) a polymer having a polymeric backbone, cyclic olefinic pendent group, and linking group linking the olefinic pendent group to the polymeric backbone,
   iii) a copolymer of ethylene and a strained, cyclic alkylene, and
   iv) ethylene/vinyl aralkyl copolymer.

22. The oxygen scavenger film of claim 16 wherein the oxygen scavenger comprises a photoinitiator.

23. The oxygen scavenger film of claim 16 comprising a functional barrier layer disposed between the layer comprising a blend of an oxygen scavenger and a polymer selected from the group consisting of high density polyethylene, polypropylene, and propylene copolymer, and the sealant layer, the functional barrier layer comprising a polymer selected from the group consisting of high density polyethylene, polypropylene, and propylene copolymer.

* * * * *